United States Patent [19]

Amend et al.

[11] 4,227,373
[45] Oct. 14, 1980

[54] WASTE HEAT RECOVERY CYCLE FOR PRODUCING POWER AND FRESH WATER

[75] Inventors: William E. Amend, Rolling Hills Estates; Walter R. Studhalter, Woodland Hills, both of Calif.

[73] Assignee: Biphase Energy Systems, Inc., Santa Monica, Calif.

[21] Appl. No.: 963,786

[22] Filed: Nov. 27, 1978

[51] Int. Cl.³ .............................................. F01K 23/10
[52] U.S. Cl. ........................................ 60/618; 60/648; 415/121 A
[58] Field of Search ................ 60/614, 616, 618, 624, 60/648; 415/121 A

[56] References Cited

U.S. PATENT DOCUMENTS

| | | | |
|---|---|---|---|
| 1,716,130 | 6/1929 | Hirshfeld | 60/648 |
| 2,215,497 | 9/1940 | Poczekal | 60/648 |
| 3,352,107 | 11/1967 | Blaskowski | 60/648 |
| 3,830,062 | 8/1974 | Morgan et al. | 60/618 |
| 3,879,949 | 4/1975 | Hays | 415/202 |

Primary Examiner—S. Clement Swisher
Attorney, Agent, or Firm—William W. Haefliger

[57] ABSTRACT

Steam is produced from aqueous brine, by a process that employs hot fluid, nozzle means and rotary separator means. Process steps include:
 (a) transferring heat from said hot fluid to said brine,
 (b) passing the heated brine in pressurized state to the nozzle means for flow therethrough, and expanding the flow therein thereby to form steam and liquid droplets, and
 (c) causing said expanded flow to rotate the rotary separator means for forming a layer of said brine on the separator means and accompanied by steam separation and for subsequent removal.

The liquid from the rotating layer and/or the separated steam may be used to drive turbine means; the hot fluid may comprise combustion products from a combustion source; and several stages of separators may be employed.

44 Claims, 8 Drawing Figures

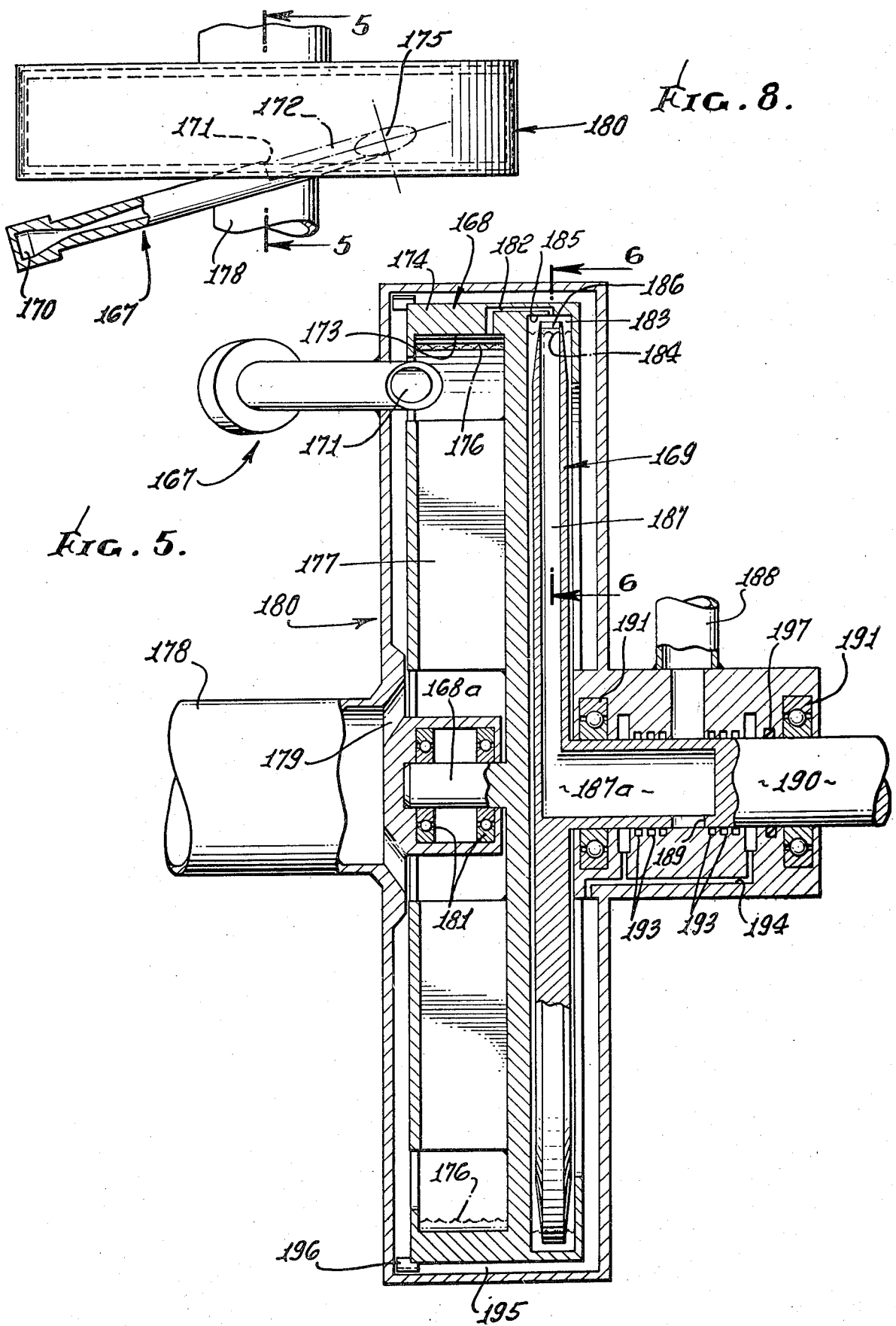

WASTE HEAT RECOVERY CYCLE FOR PRODUCING POWER AND FRESH WATER

BACKGROUND OF THE INVENTION

This invention relates generally to systems to recover waste heat for producing power and/or fresh water; more particularly it concerns use of rotary separator and turbine elements in a cycle to achieve these objectives.

There is a constant requirement and need for efficient systems to recover waste heat, to produce power and to produce fresh water from brine such as sea water. While many heat recovery cycles and fresh water producing systems have been proposed in the past, none are believed to embody the many unusual advantages in construction, mode of operation, and results as are now achievable through use of the present invention.

SUMMARY OF THE INVENTION

Basically the invention provides an efficient and simple method of recovering "waste heat" in the exhaust gas from diesel engines, gas turbines, boiler plants and the like. Heat is recovered from the relatively low level of engine exhaust by transfer to a liquid, which is then expanded in a nozzle to produce a "biphase" fluid (mixture of liquid drops and gas). The kinetic energy of the expanding gas is largely imparted to the liquid, where the energy is available to drive a liquid turbine. A nozzle, and rotary separator and liquid turbine components are provided, and the cycle as a whole, has significant advantages over Rankine cycles, which evaporate a fluid to operate a gas turbine. These advantages include simplicity and reliability, low temperature operation of rotating parts, lower speeds, more efficient heat transfer, and potentially improved thermodynamic efficiency. In this regard, a simple system embodying the invention typically costs between 50 and 60 percent of the comparable cost of a Rankine system.

While the basic system as referred to possesses all of the advantages mentioned above in a marine application, and in addition produces a supply of fresh water, it can also be used to concentrate brine in certain industrial applications while producing power from waste heat. The cycle power production efficiency is competitive with the more costly Rankine cycle, and a fraction of the brine or sea water used in the cycle is delivered as potable water while concomitantly concentrating the brine.

Basically, the method of the invention involves transferring heat from hot fluid (such as hot products of combustion) to liquid such as brine; passing the brine in pressurized state to nozzle; means for expansion therein to produce steam and liquid droplets in a jet; and employing the kinetic energy of the jet to rotate a rotary separator to form a rotating layer or ring of liquid on the separator accompanied by separation of the vapor or steam in usable form (i.e. to produce fresh water after condensation). The energy of the rotating ring of liquid on the separator is then typically employed to drive a turbine to derive shaft power output, and the rejected brine may be re-used as will be described. Several separator and turbine stages may be employed to increase efficiency, in the manner as will be described.

These and other objects and advantages of the invention, as well as the details of illustrative embodiments, will be more fully understood from the following description and drawings, in which:

DRAWING DESCRIPTION

FIG. 1 is a system diagram;
FIG. 2 is a modified system diagram;
FIG. 3 is a graph of cycle efficiencies;
FIG. 4 is a side elevation of a nozzle, separator and turbine combination;
FIG. 5 is an enlarged sectional elevation taken on lines 5—5 of FIG. 8;
FIG. 6 is a fragmentary section on lines 6—6 of FIG. 5;
FIG. 7 is an enlarged section on line 7—7 of FIG. 6; and
FIG. 8 is a top plan view, partly in section, of the FIG. 4 combination.

DETAILED DESCRIPTION

Figure 1:
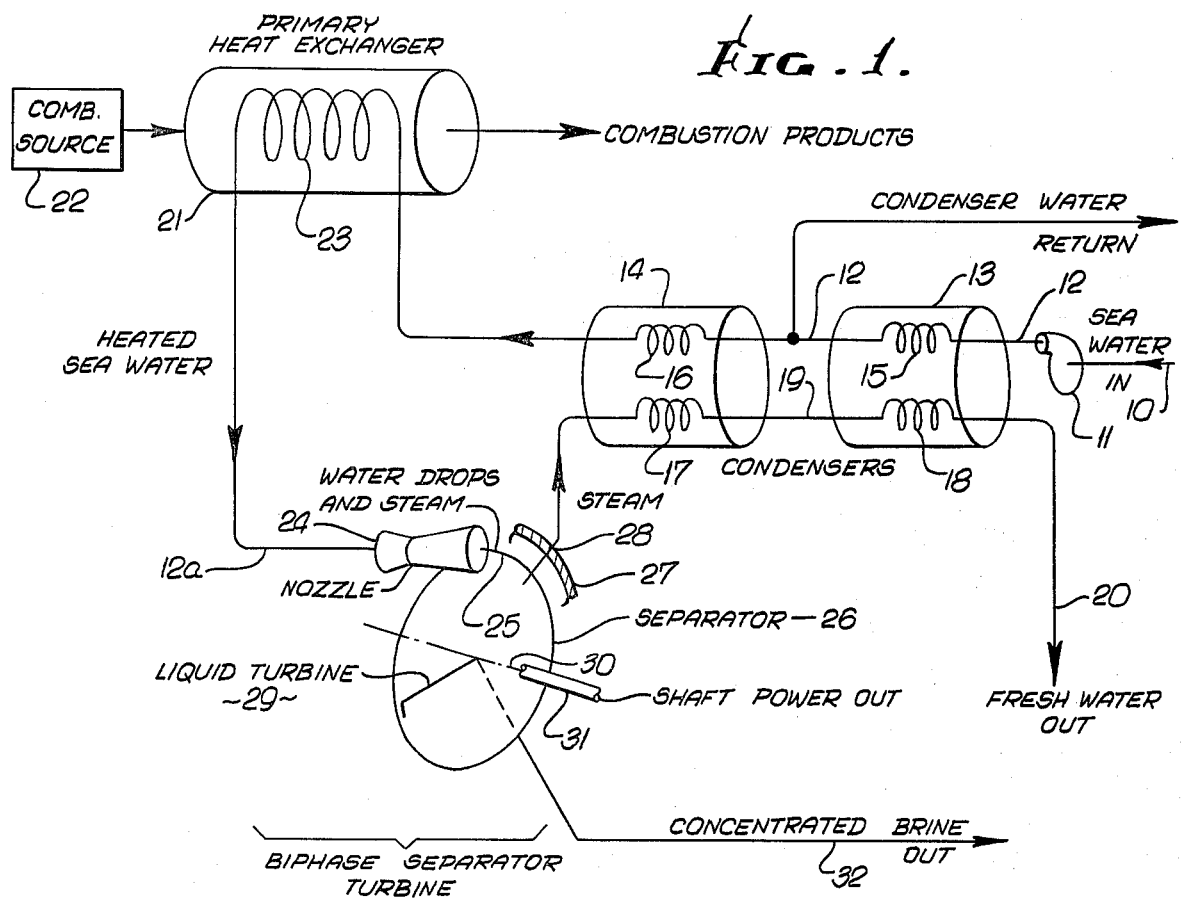

The basic waste heat recovery cycle for producing power and fresh water is shown in FIG. 1. Brine, such as sea water for example, (or other liquid) is supplied at 10, and its pressure is elevated if need be by pump 11. The relatively cool brine then flows at 12 through heat transfer means such as condensers 13 and 14 containing coils 15 and 16, wherein it is heated by heat transfer from coils 17 and 18. Vapor passed at 19 through the latter coil is condensed to supply such heat, and in the case of steam, the resultant fresh water condensate is removed at 20 for use.

The heated liquid or brine then enters the primary heat exchanger 21 wherein it picks up heat from waste hot fluid, as for example hot products of combustion produced by a source 22 such as an internal combustion engine. The overall system has special utility in marine applications, where for example Diesel engines are widely used. In this regard, the brine may flow through a coil 23 over which the hot products of combustion flow, as indicated.

The heated liquid or brine is then conducted at 12a to nozzle means (as for example nozzle 24) connected or located to receive that liquid for flow through the nozzle means and expansion therein to form vapor and liquid droplets in a jet 25 discharged from the nozzle. Such a nozzle is described in U.S. Pat. No. 3,879,949 to Hays et al. The expansion imparts kinetic energy to the liquid drops, and the two-phase mixture in the jet impinges on the rim of a rotary separator 26. The latter is located in the path of the jet to be rotated by the jet for producing a layer of liquid on the separator rim, as described in U.S. Pat. No. 3,879,949. Vapor separation from the jet and from the liquid also occurs, the vapor being accumulated within a housing 27 containing the separator, and exiting from the housing at 28. That vapor then flows to the condensers 14 and 13 as referred to above.

Also provided is liquid turbine means indicated schematically at 29, the common axis of the rotary separator 26, rotary turbine 29, and output shaft 30 appearing at 31. Liquid from the rotating ring or layer formed on the separator rim is removed to drive the turbine, in the manner described in U.S. Pat. No. 3,879,949, and also below, in FIGS. 4–8, power produced by the turbine being taken out at shaft 31. Spent liquid such as concentrated brine exits from the turbine at 32, and may be returned to the sea. The amount of fresh water obtainable in this way is a substantial fraction of the volume of brine entering the cycle.

FIGS. 4-8 illustrate typical nozzles 167, separator wheel 168 rotating within casing 180, and radial-flow turbine 169, shown as coaxially rotatable within the casing. The liquid and vapor or gas mixture is supplied at high pressure to the nozzle inlets 170. The mixture expands to low pressure at the nozzle exits 171, and the resulting high-velocity two-phase jets 172 impinge on the inner surface 173 of the rim 174 of the rotating separator at locations 175, seen in FIG. 8. The briny liquid becomes concentrated in a layer 176 on the inner surface 173 due to the inertia of the liquid and to centrifugal force, while the gas or steam separates and flows radially inward through passages 177 and enters the discharge pipe 178 through ports 179 in the stationary casing or housing 180. The rotating separator is supported by bearings 181 mounted in the housing 180, and receiving a separator wheel axle 168a.

The rotation of the separator 168 is impeded only by windage and bearing friction losses which can be very small. Thus only a very small relative velocity between the impinging jet 172 and the surface 173, aided by the torque imparted to the rotating separator by the inward flow of the gas through passages 177, serves to maintain the speed of the liquid layer 176 at a value nearly equal to that of the jets 172.

The liquid flows from the liquid layer 176 through passages 182 in the rim of the rotating separator 168 and then into annular chamber 183 which forms an integral part of the separator wheel 168. As a result another liquid layer 184 is formed, held against the surface 185 by centrifugal force. This layer furnishes the fluid energy source for the turbine rotor 169 rotating concentrically within the separator wheel and having turbine inlet passages 186 immersed in the liquid layer 184.

Figure 6:
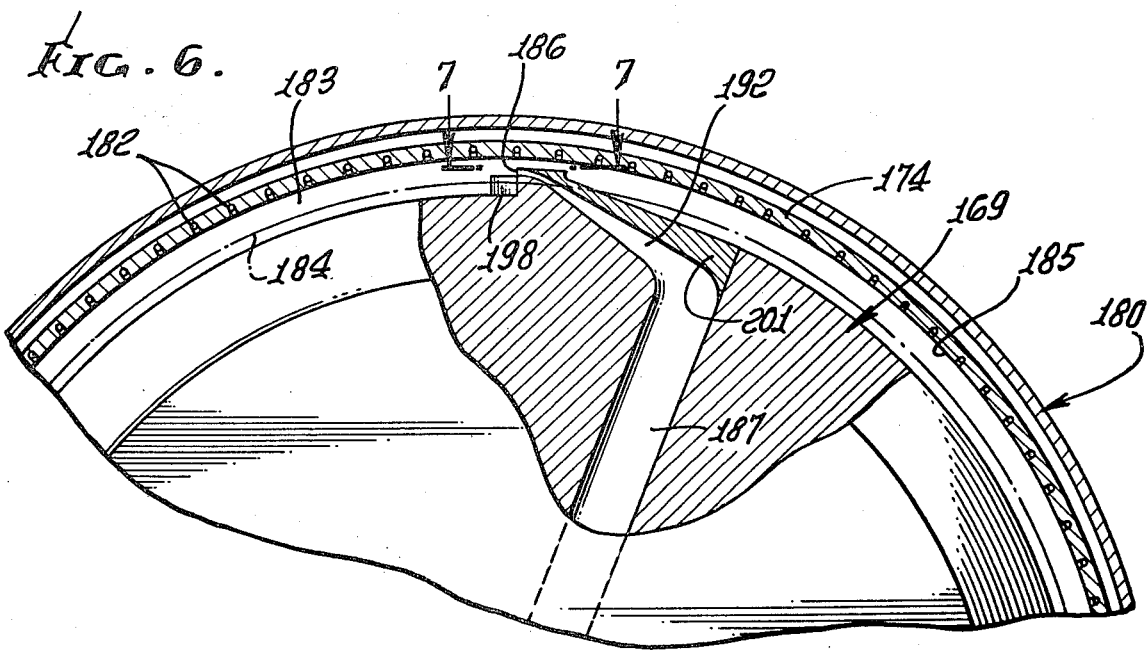

The turbine 169 may have blades or passages arranged to intercept the liquid layer 184, and FIGS. 5 and 6 show a radial-flow type turbine. The turbine rotor 169 typically rotates at a lower angular velocity than the separator wheel 168, causing liquid from the layer 184 to enter the inlets 186, flow radially inward through passages 187, and flow to liquid outlet pipe 188 via axial passage 187a in shaft 190 and apertures 189 in the wall of the turbine shaft 190. The shaft 190 is connected to the load to be driven. The turbine 169 is supported on bearings 191.

Each turbine passage 187 can optionally incorporate a diffuser 192 in which the velocity of the liquid entering inlet 186 can be partially converted to pressure such that, even allowing for the pressure drop in the radial passages 187 due to centrifugal force, the liquid pressure in discharge pipe 188 is substantially higher than the pressure in the turbine casing 180, and, in fact, greater than the pressure at the nozzle inlets 170. Thus the diffusers 192 can supply any need for pumping of the liquid.

For operation with high pressure at the discharge 188, the leakage of liquid between the shaft 190 and the housing 180 is reduced by labyrinth seals 193 and drains 194 which return liquid leakage to the bottom 195 of the housing 180, where the liquid from this and other internal leakage sources is picked up by slinger blades 196 and thrown back into the jets 172. Leakage to the outside of housing 180 is prevented by a shaft seal 197.

The external shape of the turbine inlet ports 186 must be such as to minimize external drag and turbulence that could disturb and retard the liquid layer 184. The design shown in FIG. 7 employs a wedge-shaped strut 198 for the portion of the turbine inlet which intercepts the surface of the liquid layer 184 so that the flow intercepted by the strut is split at 199 with minimum disturbance and returned with little velocity loss to the liquid layer in the wake region 200 behind the turbine inlet 186.

To allow for operation at different liquid flow rates, the passage 192 may be equipped with moveable walls 201 which serve to vary the area of the turbine inlets 186.

Accordingly, the FIGS. 4-8 embodiment provide, essentially, a moving surface to enable separation of the gas and liquid phases with extremely low friction, said surface comprising a first wheel having a periphery toward which the jet is tangentially directed, which is free to rotate, and including means to capture first fluid which has been separated from the second and has acted to impart rotation to the wheel but with essentially no power transfer. Also, they provide a second wheel having a periphery extending in proximity with the periphery of the first wheel whereby the two wheels define a gap therebetween to receive the separated first fluid and supply the fluid to the second wheel wherein the kinetic energy of the fluid is converted partly to shaft power and partly to pumping power.

Figure 2:
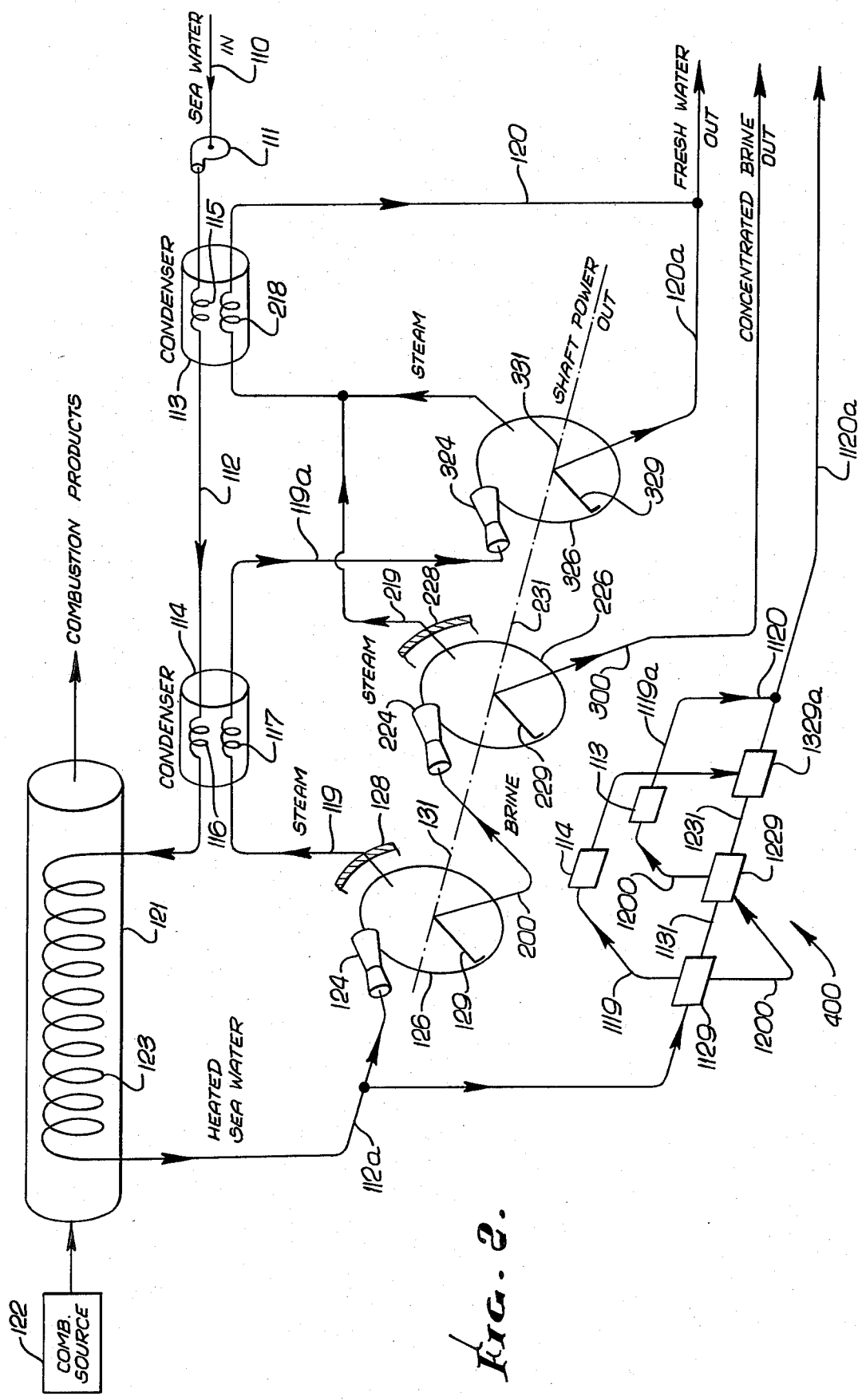
Figure 4:
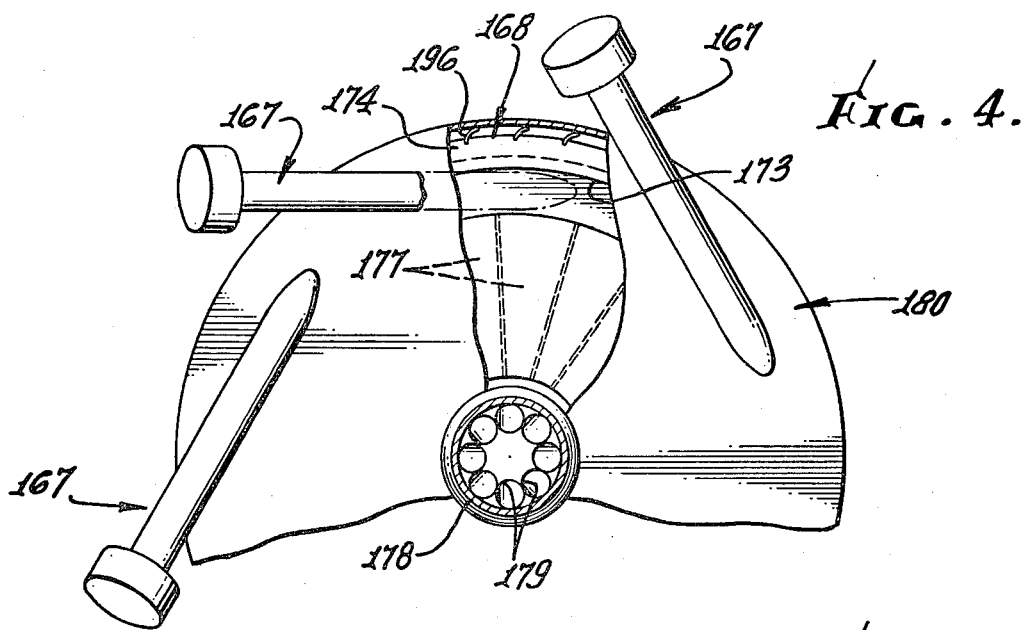
Figure 7:
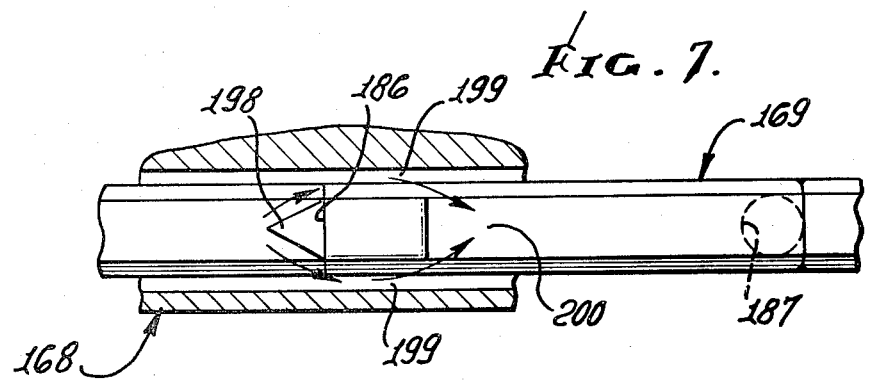

Referring now to FIG. 2, sea water enters the modified system at 110, is pressurized by pump 111 and passes at 112 through coil 115 in condenser 113 and through coil 116 in condenser 114. The brine then passes through coil 123 in primary heat exchanger 121 corresponding to exchanger 21 in FIG. 1. An engine 122 corresponds to engine 22 in FIG. 1.

The heated sea water is then passed at 112a to first stage nozzle means at 124 for flow and expansion therein to form vapor such as steam, and liquid droplets, in a first stage jet. A first stage rotary separator means 126 is located in the path of that jet to be rotated by kinetic energy of the jet for producing a layer of liquid on the separator means (as described above), accompanied by vapor or steam separation. Steam passes at 119 from the separator housing 128 to coil 117 in condenser 114, where it is partly condensed and passed as pressurized steam and water droplets to nozzle 324 associated with a third rotory separator means 326.

A first stage turbine 129 is associated with separator 126 and receives liquid brine from the rotating layer on separator 126 to drive that first turbine stage, an output shaft being indicated 131. Brine at reduced pressure that has passed through turbine 129 is passed at 200 to second stage nozzle means 224 for flow and expansion therein to form steam and liquid droplets in a second stage jet. The latter impinges on a second stage rotary separator means 226 (in the path of the jet) to rotate that separator and produce a layer of brine on that separator and rotating therewith. Separated steam is passed at 219 from housing 228 to coil 218 of condenser 113, for condensation and removal at 120 as fresh water. A second stage turbine means 229 communicates with the separator 226 (in the manner described above) to receive liquid brine from the rotating layer, such kinetic energy driving the second stage turbine. Brine that has passed through that turbine is rejected at 300. A second stage turbine output shaft is indicated at 231.

A third stage rotary turbine is indicated at 329 and as communicating with the third stage rotary separator 326. Liquid separated by the separator 326 is employed to drive turbine 329, in the same manner as in the described first and second stages. In this case, the liquid passing through the separator and turbine is typically fresh water, so that such water that is rejected by the turbine at 120*a* may be combined with fresh water stream 120. A turbine output shaft is indicated at 331.

All the turbine stages 129, 229 and 329 may be located on a common shaft, or their shafts 131, 231 and 331 may be interconnected. Further, all separator and turbine stages in FIG. 2 may be coaxial. FIG. 2 also shows a parallel system 400 of separator turbine stages 1129, 1229 and 1329 corresponding to stages 129, 229 and 329, with connections to condensers 114 and 113 as shown. System 400 is otherwise the same as the FIG. 2 systems described means, with corresponding elements preceded by an added digit.

Figure 3:
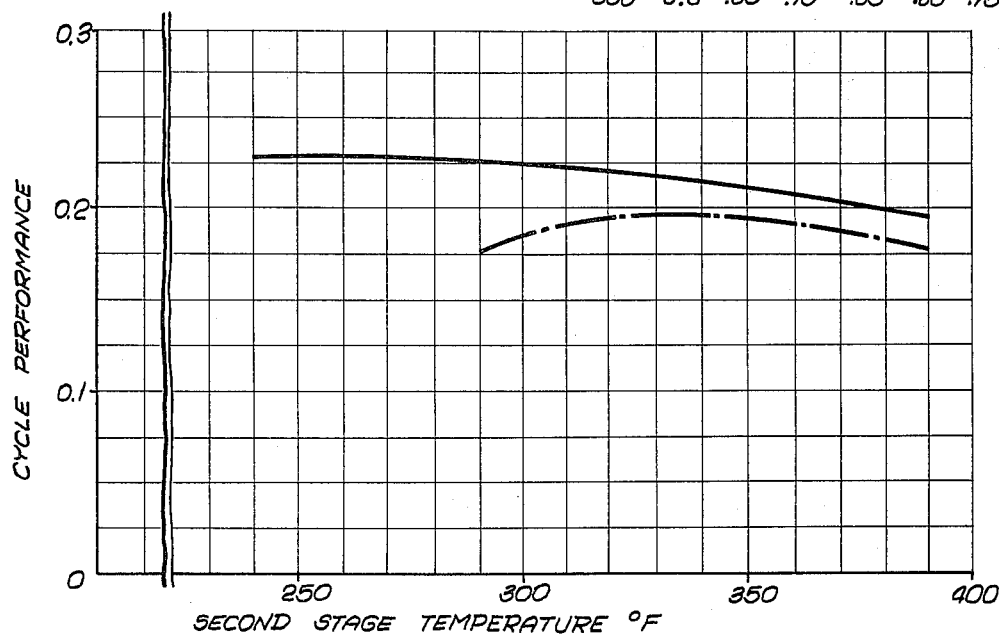

In a typical installation employing an internal combustion engine producing hot products of combustion at 700° F., the sea water working fluid can be heated to 600° F., and delivered to the first nozzle as saturated liquid water at 1534 psia. The intermediate stage temperature is a variable; and using the conservative assumptions incorporated in FIG. 3, this temperature can be chosen at 340° F., giving a second stage pressure of 118 psia. The cycle illustrated has cycle efficiency of 23%.

The overall cycle efficiency, defined as net turbine power output divided by net power output plus heat rejected, $h_c = P_n/(P_n + Q_c)$, has been estimated for the waste heat conditions outlined above. This is plotted in FIG. 3 as a function of the intermediate stage temperature, and for various degrees of conservatism in the assumptions. The quality of entering fluid (percent steam), X, varies from 0 to 20. Turbine nozzle efficiency, $h_n$, is taken as 80 to 90%, with turbine efficiency, $h_t$, at 75% to 80%. The estimates, which represent currently demonstrated parameters, show cycle efficiency levels up to 23 percent. This cycle efficiency competes with well-developed organic Rankine cycles (which do not deliver by-product water).

The described cycle tranfers heat to the sea water at normal concentration. A special feature of the cycle is that the more concentrated brine contacts the nozzles and separators in a transistory manner which precludes corrosion. This has been domenstrated with highly corrosive geothermal brines. The cycle can be operated so that no water is evaporated from surfaces, to eliminate buildup and corrosion problems, at a slight sacrifice of cycle efficiency, i.e. the dotted curve in FIG. 3. The cycle is also readily scalable from very small sizes to very large sizes.

In summary, the described marine cycle will conserve the "waste heat" of ship's engine exhaust gas, producing shaft power to run electrical auxiliaries and also fresh water. The shaft power produced is equivalent to that from the more complicated and expensive organic Rankine cycle boilers which do not deliver fresh water.

Advantages also include:

1. Low first cost; low operating cost.
2. Simplicity, and reliability. Very few close tolerances required.
3. No additional fluids required; no problems with toxid materials.
4. Scalable in size.
5. Efficient countercurrent heat exchange (smaller exchangers) because of reduced vaporization duty.
6. Low turbine RPM (eliminates gearboxes).
7. No concentrated brine handled in heat exchangers (relative to other water makers).

We claim:

1. In a method for producing steam from aqueous brine, employing hot fluid, nozzle means, and rotary separator means, the steps that include
   (a) transferring heat from said hot fluid to said brine,
   (b) passing the heated brine in pressurized state to the nozzle means for flow therethrough, and expanding the flow therein thereby to form steam and liquid droplets, and
   (c) causing said expanded flow to rotate the rotary separator means for forming a layer of said brine on the separator means and accompanied by steam separation and for subsequent removal.

2. The method of claim 1 wherein turbine means is utilized, and including the steps of passing liquid from said rotating layer to the turbine means to drive same.

3. The method of claim 1 including the step of condensing said steam to provide fresh water.

4. The method of claim 1 including the step of passing said brine, prior to said heating thereof, into heat transfer relation with said steam to condense same.

5. The method of claim 2 including the step of extracting power from said turbine.

6. The method of claim 1 wherein the hot fluid comprises combustion products.

7. The method of claim 6 including the step of operating a combustion source to produce said combustion products.

8. The method of claim 6 including the step of operating an engine to produce said combustion products.

9. In a method for producing vapor from liquid, and employing hot fluid, nozzle means, and rotary separator means, the steps that include
   (a) transferring heat from said hot fluid to said liquid,
   (b) passing the heated liquid in pressurized state to the nozzle means for flow therethrough and expanding said flow therein to form vapor and liquid droplets, and
   (c) causing the expanded flow to rotate the rotary separator means for forming a layer of said liquid on the separator means and accompanied by vapor separation.

10. The method of claim 9 wherein turbine means is utilized, and including the step of passing liquid from said rotating layer to the turbine means to drive same.

11. The method of claim 9 including the step of passing said liquid, prior to said heating thereof, into heat transfer relation with said vapor to condense same.

12. The method of claim 9 wherein said hot fluid comprises hot combustion products.

13. In a method for producing vapor from liquid, and employing hot fluid, multiple nozzles and multiple rotary separators, and multiple rotary turbines, the steps that include
   (a) transferring heat from said hot fluid to said liquid,
   (b) passing the heated liquid in pressurized state to a first stage nozzle for flow therethrough and expanding said flow therein to form vapor and liquid droplets,
   (c) causing the expanded flow to rotate a first stage separator associated with said first stage nozzle for forming a first layer of said liquid on that separator and accompanied by first stage vapor separation,
   (d) passing liquid from said first layer to first stage turbine means to drive same,
   (e) receiving liquid discharged from said first stage turbine means and passing the received liquid in pressurized state to a second stage nozzle for flow therethrough and expanding said flow therein to form vapor and liquid droplets, (f) causing the expanded flow from the second stage nozzle to rotate a second stage separator associated with said second stage nozzle for forming a second layer of said liquid on that separator and accompanied by second stage vapor separation, and (g) passing liquid from said second layer to second stage turbine means to drive same.

14. The method of claim 13 wherein said liquid comprises aqueous brine.

15. The method of claim 14 wherein said hot fluid comprises hot products of combustion.

16. The method of claim 15 that includes operating an engine to produce said hot products of combustion.

17. The method of claim 13 including interconnecting said turbines to produce power at a common output.

18. The method of claim 13 including the step of passing said liquid, prior to said heating thereof, into heat transfer relation with said separated vapor to condense same.

19. The method of claim 9 wherein a turbine is provided, and including the step of passing separated vapor in pressurized state to said turbine to drive same.

20. The method of claim 13 wherein a third turbine is provided, and including the step of passing first stage separated vapor in pressurized state to said third turbine to drive same.

21. The method of claim 20 including operating all of said turbines to drive a common output shaft.

22. In a system for producing vapor from liquid, and employing hot fluid, the combination comprising (a) heat transfer means receiving the hot fluid and liquid for transfer of heat from the hot fluid to said liquid, (b) nozzle means connected to receive heated liquid from said heat transfer means for flow through the nozzle means and expansion therein to form vapor and liquid droplets in a jet, and (c) rotary separator means located in the path of said jet to be rotated by the jet for producing a layer of said liquid on the rotating separator means accompanied by vapor separation.

23. The system of claim 22 including turbine means communicating with said separator means to receive liquid from said layer to drive the turbine means.

24. The system of claim 22 including other heat transfer means receiving the liquid prior to said heating thereof and also receiving the separated vapor for transferring heat from the vapor to the liquid, thereby to condense said vapor.

25. The system of claim 22 wherein said hot fluid comprises hot combustion products.

26. The system of claim 22 wherein said liquid comprises aqueous brine.

27. The system of claim 25 wherein said liquid comprises aqueous brine.

28. The system of claim 27 including an engine producing said hot combustion products, and means conducting said products from the engine exhaust to said heat transfer means.

29. In a system for producing vapor from liquid, and employing hot fluid, the combination comprising (a) heat transfer means receiving the hot fluid and liquid for transferring heat from the hot fluid to said fluid, (b) first stage nozzle means connected to receive heated liquid from said heat transfer means for flow through the nozzle means and expansion therein to form vapor and liquid droplets in a first stage jet, (c) first stage rotary separator means located in the path of said first stage jet to be rotated thereby for producing a layer of liquid on the first rotating first stage separator means accompanied by vapor separation, (d) first stage turbine means communicating with said first stage separator means to receive liquid from said layer to drive the turbine means, (e) second stage nozzle means connected to receive liquid discharged from said first stage turbine means for flow through the second stage nozzle means and expansion therein to form vapor and liquid droplets in a second stage jet, (f) second stage rotary seaparator means located in the path of the second stage jet, to be rotated thereby for producing a layer of liquid on the second stage rotary separator means, accompanied by vapor separation, and (g) second stage turbine means communicating with said second stage separator means to receive liquid from said layer thereon to drive the second stage turbine means.

30. The system of claim 29 wherein said hot fluid comprises hot combustion products.

31. The system of claim 29 wherein said liquid comprises aqueous brine.

32. The system of claim 30 wherein said liquid comprises aqueous brine.

33. The system of claim 32 including an internal combustion engine producing said hot combustion products, and means conducting said products from the engine exhaust to said heat transfer means.

34. The system of claim 29 wherein a third separator and turbine step is provided and communicates with said first stage separator means to receive vapor and condensed liquid droplets in pressurized state to be separated by said third stage separator so that liquid from the separator drives said third stage turbine after separation of vapor by the third stage separator.

35. The system of claim 34 wherein said turbines have output shafts which are interconnected.

36. The method of claim 1 wherein said hot fluid comprises a waste heat gas.

37. The method of claim 1 including the step of passing said separated steam through a steam turbine to drive the turbine and produce power.

38. The method of claim 1 including a source of waste heat from which said hot fluid is derived.

39. The method of claim 14 including a source of waste heat from which said hot fluid is derived.

40. The method of claim 22 including a source of waste heat from which said hot fluid is derived.

41. The method of claim 32 including a source of waste heat from which said hot fluid is derived.

42. The method of claim 1 wherein the nozzle means includes first and second nozzles connected in parallel and to which the heated brine is passed, and the separator means includes first and second rotary separators to which the expanded flow from the first and second nozzles is respectively passed.

43. The method of claim 42 wherein turbine means is utilized and includes first and second turbines, and including the step of passing liquid from the rotating layers associated with the first and second separators to the respective first and second turbines to drive same.

44. The method of claim 42 wherein turbine means is utilized and includes first and second turbines, and including the step of passing the steam separated at the first and second separators to the respective first and second turbines to drive same.

* * * * *